US012155222B2

(12) United States Patent
van der Velden et al.

(10) Patent No.: US 12,155,222 B2
(45) Date of Patent: Nov. 26, 2024

(54) ENERGY HARVESTING SYSTEM

(71) Applicant: NEXPERIA B.V., Nijmegen (NL)

(72) Inventors: Joram Pieter van der Velden, Nijmegen (NL); Gustavo Campos Martins, Nijmegen (NL)

(73) Assignee: NEXPERIA B.V., Nijmegen (NL)

( * ) Notice: Subject to any disclaimer, the term of this patent is extended or adjusted under 35 U.S.C. 154(b) by 42 days.

(21) Appl. No.: 18/303,887

(22) Filed: Apr. 20, 2023

(65) Prior Publication Data
US 2023/0344270 A1 Oct. 26, 2023

(30) Foreign Application Priority Data

Apr. 22, 2022 (NL) ...................................... 2031659

(51) Int. Cl.
*H02J 50/00* (2016.01)
*H02J 50/20* (2016.01)
*H02J 50/30* (2016.01)
*H02M 1/10* (2006.01)

(52) U.S. Cl.
CPC ............ *H02J 50/001* (2020.01); *H02J 50/20* (2016.02); *H02J 50/30* (2016.02); *H02M 1/10* (2013.01); *H02J 2207/40* (2020.01); *H02J 2300/26* (2020.01)

(58) Field of Classification Search
CPC ....... H02J 50/001; H02J 2207/40; H02M 1/10
See application file for complete search history.

(56) References Cited

U.S. PATENT DOCUMENTS

| 2007/0170785 A1* | 7/2007 | McCoy | H02M 1/10 307/130 |
| 2017/0019028 A1* | 1/2017 | Tseng | H02M 7/12 |
| 2023/0327482 A1* | 10/2023 | Ross | H02J 7/007184 307/104 |

FOREIGN PATENT DOCUMENTS

KR 20100049976 A * 5/2010

* cited by examiner

*Primary Examiner* — Ryan Johnson
(74) *Attorney, Agent, or Firm* — Ruggiero McAllister & McMahon LLC

(57) ABSTRACT

The present disclosure relates to an energy harvesting system for converting a low-voltage input of an energy harvesting source into a Direct Current (DC) output voltage. The energy harvesting source is one of an energy harvesting source providing an Alternating Current (AC) output such as a piezoelectric energy harvesting source, and an energy harvesting source providing a DC output such as a photovoltaic energy harvesting source.

18 Claims, 2 Drawing Sheets

ENERGY HARVESTING SYSTEM

CROSS-REFERENCE TO RELATED APPLICATIONS

This application claims the benefit under 35 U.S.C. § 119(a) of Dutch Application No. 2031659 filed Apr. 22, 2022, the contents of which are incorporated by reference herein in their entirety.

BACKGROUND

1. Field of the Disclosure

The present disclosure generally relates to energy harvesting systems. More specifically, the present disclosure relates to energy harvesting system which are arrange for both energy harvesting sources which provide a Direct Current, DC output, and energy harvesting sources which provide an Alternating Current, AC output.

2. Description of the Related Art

Nowadays, billions of radio frequencies, RF, transmitters are broadcasting RF energy in a continuous manner. For example, mobile telephones, base stations, radio broadcast stations, WiFi access points as well as handheld radios all transmit RF signals. The ability to harvest RF energy, from ambient or dedicated sources, enables wireless charging of, for example, sensor devices.

RF is not the only source to harvest energy from, also photovoltaic sources are highly suitable as energy harvesting sources, and so are piezoelectric energy sources, and thermoelectric and other types of energy sources.

Energy harvesting, also known as power harvesting or energy scavenging or ambient power, is the process by which energy is derived from external sources, for example Radio Frequency energy, solar power, thermal energy, wind energy, salinity gradients, and kinetic energy, also known as ambient energy, captured, and stored for small, wireless autonomous devices, like those used in wearable electronics and wireless sensor networks.

Miniaturization and improvements on integrated circuit designs have emerged low-power electronics enabling low-power wireless sensor networks, Internet-of-Things, IoT modules and all sorts of small electronic devices which may be employed in a large number of locations and for a variety of applications which make battery replacement undesirable and challenging.

With the use of energy harvesters, energy can be harvested from ambient or dedicated sources, which reduce the need for replacing batteries or even achieve battery-less or near-perpetual operation of those devices.

As energy harvesting sources, by nature, can be sporadic, unstable, time and environmentally changing, it is considered challenging to harvest sufficient energy from the energy harvesting sources to prevent such battery replacement. As such, efficiency is key in energy harvesting. It is thus desirable to have an energy harvesting systems with on the one-hand improved efficiency, and on the other hand keep the design simple, without the need for additional circuitry and with a device or assembly footprint which is kept as small as possible.

SUMMARY

In a first aspect there is provided an energy harvesting system for converting a low-voltage input of an energy harvesting source into a DC output voltage, wherein said energy harvesting source is one of an energy harvesting source providing an Alternating Current, AC, output such as a piezoelectric energy harvesting source, and an energy harvesting source providing a Direct Current, DC, output such as a photovoltaic energy harvesting source, wherein said energy harvesting system comprises:

a first input terminal (H+) and a second input terminal (H−), arranged for connecting one of said energy harvesting sources between said first and second input terminals; an output terminal (Vout), arranged for connecting with a load such as a wireless sensor node;

a AC-DC converter unit, connected between said first and second input terminals and said output terminal, arranged for converting an AC input between said first and second input terminals into a DC output at said output terminal;

control unit, connected to said AC-DC converter unit, arranged for operating said AC-DC converter unit in an operational mode or bypass said AC-DC converter unit;

a source differentiation circuit, connected to one of said first and second input terminal and to said control unit, arranged for detecting one of said AC output providing energy harvesting source and said DC output providing energy harvesting source at said connected input terminal, and generating a control signal based on said detected energy harvesting source;

wherein said control circuit is arranged to subsequently bypass said AC-DC converter, activate said source differentiation circuit to receive said control signal, and to operate said AC-DC converter in accordance with said control signal such that said AC-DC converter is operational when said AC output providing energy harvesting source is detected, and bypassed when said DC output providing energy harvesting source is detected.

Energy harvesting systems are energy harvesting power management circuitry which are arranged for obtaining at an input terminal pair, a low-voltage input from an energy harvesting source, and at an output terminal, outputting a DC output voltage for connecting a load such as a sensor node or wireless sensor network device or a DC-DC converter. The load being connected between the positive output terminal and a ground.

As energy harvesting sources may be unstable and provide fluctuating output voltages or may even temporarily stop providing any output voltage, combining different types of energy harvesting sources is considered to at least partly reduces these drawbacks. Such a multi-input energy-harvesting system may be arranged to convert energy from several harvesting sources into a regulated DC output for the load, sensor, or the like. For example the combination of an energy harvesting system in which both energy can be harvested from piezo elements and from photovoltaic cells or thermoelectric, is considered a promising and effective multi-input energy harvesting system.

These different energy harvesting sources however have different requirements for obtaining the regulated and desired DC output. Not only may voltage levels differ between the different sources, but some sources may provide AC outputs whereas others may provide DC outputs. As the AC output in addition requires a AC-DC converter, a typical multi-input energy harvesting system is configured with separate inputs for each type of source. This however increases the number of input terminals and increases the overall complexity of the system and increases footprint.

Combining several inputs in a configuration wherein any type of energy harvesting source may be connected to a single input terminal pair, is challenging as it may require additional external circuitry to distinguish between AC based sources and DC based sources and to detect which type is currently connected.

It was in insight of the inventor to provide the energy harvesting system with an integrated source differentiation circuit, as well as a controllable AC-DC converter and a control unit to obtain a control signal from the differentiation circuit to distinguish between AC and DC output providing energy harvesting sources, and to either activate or bypass the AC-DC converter based on this control signal.

With the proposed energy harvesting system a single-channel energy harvesting system is achieved without requiring any other external circuitry, or input providing information on the type of source being connected.

The proposed energy harvesting system comprises a source differentiation circuit which is arranged to output a binary signal on a TTL/CMOS voltage level which defines whether a DC source is connected, e.g. providing a binary control signal of 0, or if a AC source or floating source is connected providing a binary control signal of 1. When the control unit detect a control signal of 1, the AC-DC converter is activated whereas it is bypassed and deactivated when the control signal is 0.

Energy sources such as piezo elements provide an output voltage and/or current with a bipolar behavior and as such the AC-DC conversion is required. Upon startup of the energy converter system, or when the energy converter system is operated in an initiation mode, wherein both the bypass circuitry (or also referred to as bypass switch) and the AC-DC converter are kept inactive. When the AC-DC converter bypassed, e.g. by activating the bypass circuitry, the system, by use of the source differentiation circuit can detect which type of energy source is connected to the input terminal pair and accordingly activate the AC-DC converter if applicable, i.e. when the source is an AC source, and bypass the AC-DC converter when the source is a DC source.

The source differentiation circuit or unit is arranged to detect, when the AC-DC converter and bypass circuitry are both inactive, if the input terminal, the second or negative input terminal H−, is connected to ground, or floating wherein the ground connection represents a DC source, and the floating representing a floating or AC source, requiring the AC-DC conversion.

In a preferred embodiment, the source differentiation circuit is connected to the second input terminal (H−), for detecting the second input terminal to be connected to ground or to be floating.

In an example, the system further comprises: a bypass circuit for bypassing the AC-DC converter.

In an example, the AC-DC converter comprises an integrated bypass circuit for operating or bypassing the AC-DC converting operation of the AC-DC converter.

In an example, a source differentiation circuit is arranged to generate a control signal representing an AC output providing energy harvesting source when the second input terminal (H−) is floating, and a DC output providing energy harvesting source when the second input terminal (H−) is connected to ground.

In an example, the source differentiation circuit is arranged for determining whether the second or negative input terminal (H−) is floating or connected to the ground node, preferably by attempting to pull said second input terminal to a voltage beyond a certain threshold voltage, and generating the control signal based on detecting whether the input terminal exceeds the predefined threshold voltage.

In an example, the source differentiation circuit comprises a pull-up network and a threshold voltage network, for comparing a voltage of the input terminal attempted to be pulled-up by the pull-up network with the threshold voltage network, for generating the control signal based on whether the input terminal exceeds the predefined threshold voltage.

In an example, the source differentiation circuit comprises an output terminal for connecting with the control unit and providing the control signal, an input terminal for connecting with the second input terminal and detecting either a connection to ground or the terminal to be floating, and an enable terminal for activating the source differentiation circuit.

In an example, the system further comprises:
   a DC-DC converter, for either converting the DC output to a higher-voltage DC output according to a conversion factor, for supplying the higher-voltage DC output to the load, or converting the DC output to a lower-voltage DC output according to a conversion factor, for supplying the lower-voltage DC output to the load.

In an example, the DC-DC converter is configured as a reconfigurable DC-DC converter arranged for converting the DC output to a higher voltage DC output or a lower voltage DC output according to a discrete selection of predefined conversion ratios.

In an example, the control unit is arranged to operate the DC-DC converter to convert the DC output in accordance with a Maximum Power Point Tracking, MPPT, control scheme, wherein the MPPT control scheme is based on matching a connected load with a current and voltage of the energy harvesting source.

In an example, the DC-DC converter is a flying capacitor inductor-less DC-DC converter.

In an example, the DC-DC converter is arranged for providing a multiple voltage level output comprising multiple output terminals having different output voltage levels.

In an example, the system comprises a multi-input DC-DC converter wherein the system comprises a plurality of parallel input terminals, source differentiation circuits and AC-DC converters for connecting each Vout with one of the inputs of said multi-input DC-DC converters.

In an example, the system is configured for connecting a piezo element energy harvesting source providing an AC output.

In an example, the system is configured for connecting a Radio Frequency, RF, energy harvesting source providing an AC output.

In an example, the system is configured for connecting a photovoltaic energy harvesting source providing a DC output.

In an example, the system is configured for connecting a thermoelectric energy harvesting source providing a DC output.

In an example, the system is integrated into an Power Management Integrated Circuit, PMIC, design.

The disclosure will now be described in more detail by means of specific embodiments, with reference to the enclosed drawings, wherein equal or like parts and/or components are designated by the same reference numerals. The disclosure is in no manner whatsoever limited to the embodiments disclosed.

BRIEF DESCRIPTION OF DRAWINGS

The present disclosure will now be explained by means of a description of an embodiment of an energy harvesting system in accordance to the first aspect of the present disclosure, in which reference is made to the following figures, in which.

DETAILED DESCRIPTION

Figure 1:
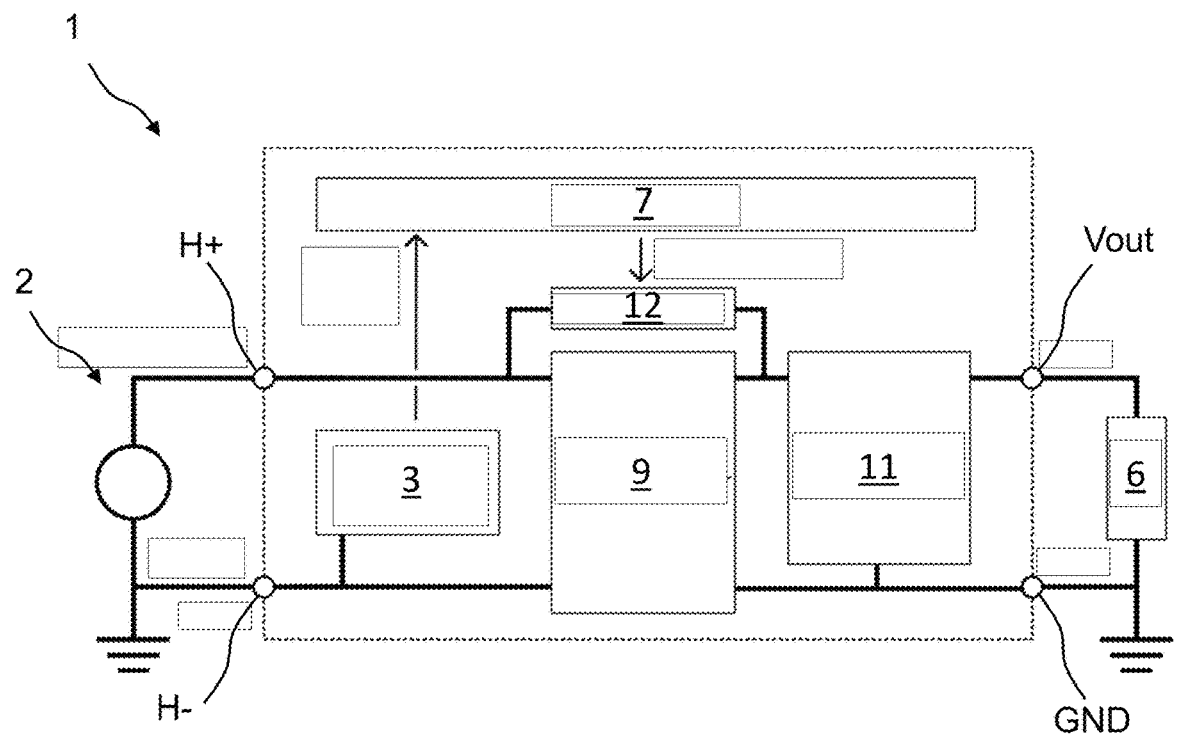
FIG. 1 shows a schematic overview of an embodiment of an energy harvesting system according to the present disclosure, wherein the energy harvesting source provides a DC output.
Figure 2:
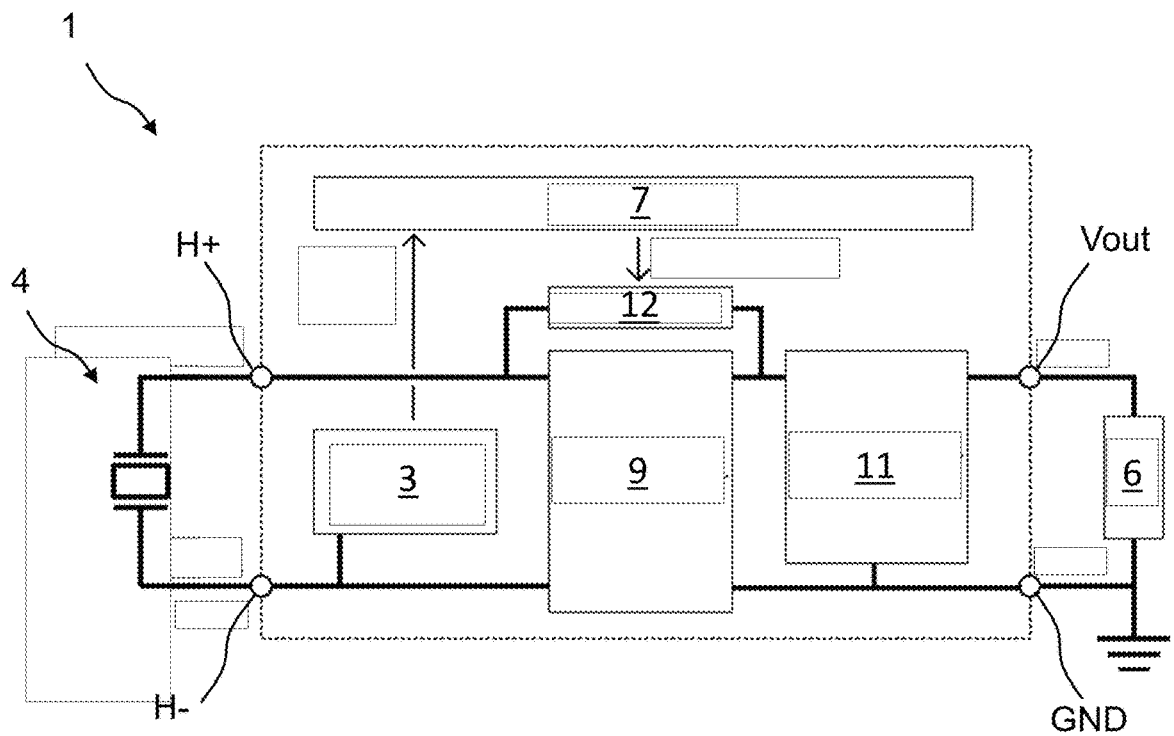
FIG. 2 shows a schematic overview of the energy harvesting system according to FIG. 1, wherein the energy harvesting source provides a AC output.

FIGS. 1 and 2 show an embodiment of an energy harvesting system 1 according to the present disclosure, for converting a low-voltage input of an energy harvesting source 2, 4 into a higher DC output voltage. In FIG. 1, the energy harvesting source 2 provides a DC output for a load 6 such as a battery or sensor node or other device 6. For example, the energy harvesting source 2 is a photovoltaic energy harvesting source. In FIG. 2, the energy harvesting source 4 provides an AC output. For example, the energy harvesting source 4 is a piezoelectric energy harvesting source or an Radio Frequency, RF energy harvesting source.

The energy harvesting source 2, 4 is connected between the first input terminal H+ and the second input terminal H– of the energy harvesting system 1. A source differentiation circuit 3 is connected to the second input terminal H–, and is arranged for detecting if the energy harvesting source 2, 4 provides a DC output or an AC output.

When the energy harvesting system 1 needs to detect which type of energy harvesting source 2, 4 is connected, for example during start-up of the energy harvesting system 1, the control unit 7 of the energy harvesting system 1 operates the AC-DC converter unit 9 of the energy harvesting system 1 in inactive mode and the bypass switch 12 is inactive as well. Subsequently the control unit 7 reads out the control signal of the source differentiation circuit 3 to detect if a DC output providing energy harvesting source 2 or an AC output providing energy harvesting source 4 is connected between the input terminals H+, H–.

When the source differentiation circuit 3 detects that a DC output providing energy harvesting source 2 is connected between the input terminals H+, H–, a binary high control signal is generated by the source differentiation circuit 3 and read out by the control unit 7. Based on the binary high control signal received by the control unit 7, the control unit 7 bypasses the AC-DC converter unit 9 by activating the bypass switch or bypass circuit 12, thereby directly connecting the DC output of the energy harvesting source 2, via switching means (not shown), to the input of the DC-DC converter 11. In FIGS. 1 and 2 the bypass switch 12 is shown as a separate unit, but the switch may also be implemented in, or integrated into the AC-DC converter 9, which accordingly may comprise an bypass input node.

When the source differentiation circuit 3 detects that an AC output providing energy harvesting source 4 is connected between the input terminals H+, H–, a binary low control signal is generated by the source differentiation circuit 3 and read out by the control unit 7. Based on the binary low control signal received by the control unit 7, the control unit 7 operates the AC-DC converter unit 9 in activated mode, and thus not activating the bypass switch 12, thereby connecting the AC output of the energy harvesting source 4, e.g. via switching means (not shown), to the input of the AC-DC converter unit 9, and, via the AC-DC converter unit 9, to the input of the DC-DC converter 11.

The control unit 7 is further arranged for controlling the conversion ratio of the DC-DC converter 11, for applying the desired higher DC output voltage to the load, such as a wireless sensor node, connected between the output terminals Vout and GND of the energy harvesting system 1.

Figure 3:
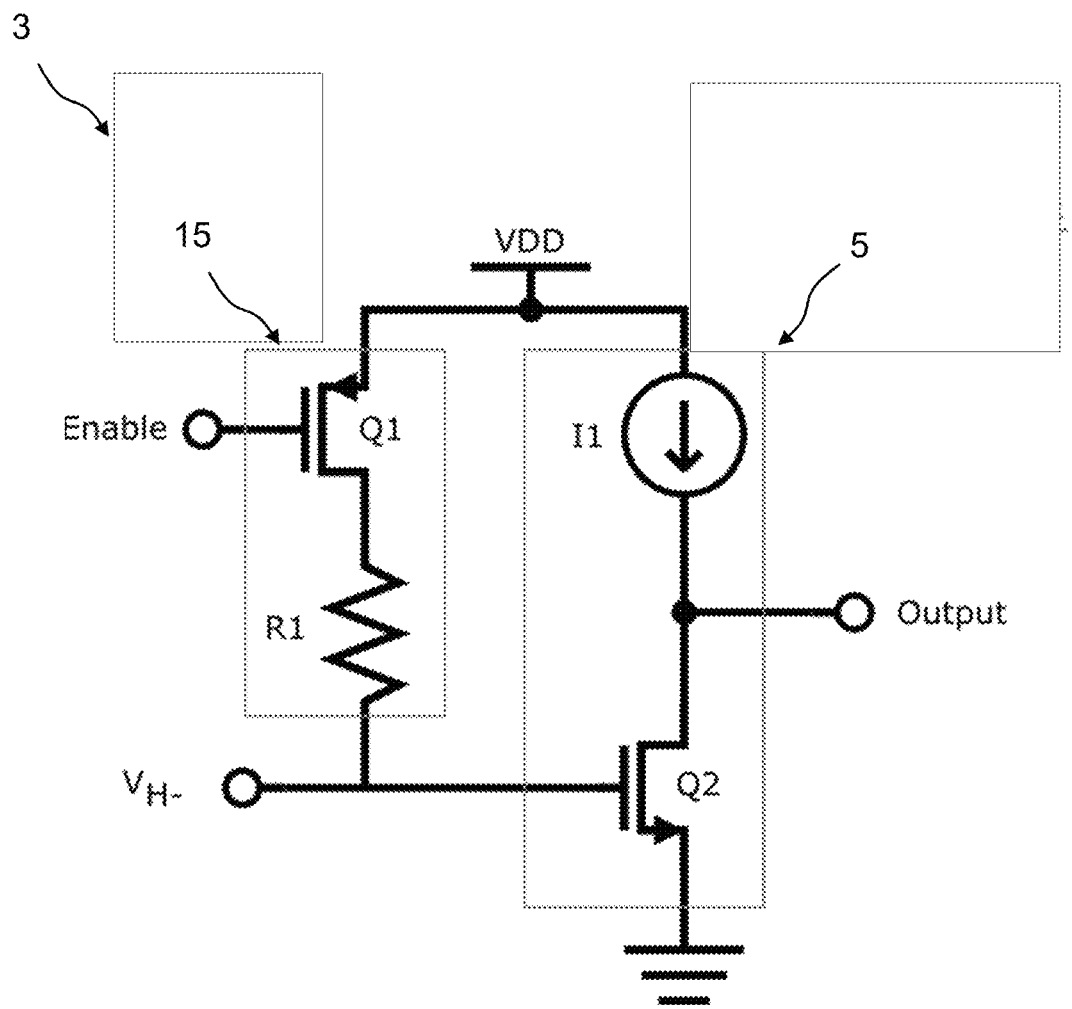
FIG. 3 shows in more detail, a schematic overview of an embodiment of a source differentiation circuit of the energy harvesting according to the present disclosure.

FIG. 3 shows in more detail an embodiment of a source differentiation circuit 3 of the energy harvesting system 1 according to the present disclosure. The source differentiation circuit 3 comprises an input terminal, connected to the second input terminal H– of the energy harvesting system 1, and an output terminal output or CTRL for connecting with the control unit 7 of the energy harvesting system 1 and for providing the control signal. The source differentiation circuit 3 furthermore comprises an enable terminal for activating the source differentiation circuit 3.

The source differentiation circuit 3 generates a binary low control signal representing an AC output providing energy harvesting source 4, when the second input terminal H– is floating, and generates a binary high control signal representing a DC output providing energy harvesting source 2, when the second input terminal H–is connected to ground.

The source differentiation circuit 3 comprises a pull-up network 15, comprising transistor Q1 and resistor R1. The pull-up network tries to pull-up the second input terminal H– to VDD, which is only possible when the terminal is floating and thus not connected to a ground node of a DC harvesting source. The voltage at the second input terminal H– is pulled-up or at least attempted to be pulled-up by the pull-up circuit 15 or network 15, and the voltage is compared with the voltage generated by the threshold voltage comparison network 5. At the output node a control signal is generated which represents the connected AC or DC harvesting source, based on whether the voltage at the second input terminal H– exceeds the voltage of the threshold voltage comparison network, such that the AC-DC converter can be bypassed accordingly.

Based on the above description, a skilled person may provide modifications and additions to the method and arrangement disclosed, which modifications and additions are all comprised by the scope of the appended claims.

What is claimed is:

1. An energy harvesting system for converting a low-voltage input of an energy harvesting source into a DC output voltage, wherein the energy harvesting source is one of an energy harvesting source providing an Alternating Current (AC) output, and an energy harvesting source providing a Direct Current (DC) output wherein the energy harvesting system comprises:

a first input terminal and a second input terminal, arranged for connecting one of the energy harvesting sources between the first and second input terminals;

an output terminal (Vout), arranged for connecting with a load;

a AC-DC converter unit connected between the first and second input terminals and the output terminal and arranged to convert an AC input between the first and second input terminals into a DC output at the output terminal;

control unit connected to the AC-DC converter unit and arranged to operate the AC-DC converter unit in an operational mode or bypass the AC-DC converter unit;

a source differentiation circuit connected to one of the first and second input terminal and to the control unit and arranged to detect one of the AC output providing energy harvesting source and the DC output providing energy harvesting source at the connected input terminal, and generating a control signal based on the detected energy harvesting source; and wherein the control circuit is arranged to subsequently bypass the AC-DC converter, activate the source differentiation circuit to receive the control signal, and to operate the AC-DC converter in accordance with the control signal so that the AC-DC converter is operational when the AC output providing energy harvesting source is detected, and bypassed when the DC output providing energy harvesting source is detected.

2. The energy harvesting system according to claim 1, wherein the source differentiation circuit is connected to the second input terminal, to detect the second input terminal to be connected to ground or to be floating.

3. The energy harvesting system according to claim 1, wherein the source differentiation circuit is arranged for determining whether the second or negative input terminal is floating or connected to ground, by attempting to pull the second input terminal to a voltage beyond a certain threshold voltage, and generating the control signal based on detecting whether the second input terminal exceeds the predefined threshold voltage.

4. The energy harvesting system according to claim 1, wherein the source differentiation circuit comprises a pull-up network and a threshold voltage network, to compare a voltage of the input terminal attempted to be pulled-up by the pull-up network with the threshold voltage network, and to generate the control signal based on whether the input terminal exceeds the predefined threshold voltage.

5. The energy harvesting system according to claim 1, wherein the source differentiation circuit comprises an output terminal to connect with the control unit and provide the control signal, an input terminal to connect with the second input terminal and detect either a connection to ground or the terminal to be floating, and an enable terminal to activate the source differentiation circuit.

6. The energy harvesting system according to claim 1, wherein the system further comprises
a bypass circuit configured to bypass the AC-DC converter.

7. The energy harvesting system according to claim 1, wherein the AC-DC converter comprises an integrated bypass circuit configured to operate or bypass the AC-DC converting operation of the AC-DC converter.

8. The energy harvesting system according to claim 1, wherein the system further comprises:
a DC-DC converter for either converting the DC output to a higher-voltage DC output according to a conversion factor, for supplying the higher-voltage DC output to the load or converting the DC output to a lower-voltage DC output according to a conversion factor, and for supplying the lower-voltage DC output to the load.

9. The energy harvesting system according to claim 1, the system further comprises a multi-input DC-DC converter, and wherein the system can further comprise a plurality of parallel input terminals, source differentiation circuits and AC-DC converters for connecting each Vout with one of the inputs of the multi-input DC-DC converters.

10. The energy harvesting system according to claim 1, wherein the system is configured to connect a piezo element or RF energy harvesting source providing an AC output.

11. The energy harvesting system according to claim 1, wherein the system is configured to connect a photovoltaic energy harvesting source providing a DC output.

12. The energy harvesting system according to claim 1, wherein the system is configured to connect a thermoelectric energy harvesting source providing a DC output.

13. The energy harvesting system according to claim 1, wherein the system is integrated into a Power Management Integrated Circuit (PMIC), design.

14. The energy harvesting system according to claim 2, wherein the source differentiation circuit is arranged to generate a control signal representing an AC output providing energy harvesting source when the second input terminal is floating, and a DC output providing energy harvesting source when the second input terminal is connected to ground.

15. The energy harvesting system according to claim 8, wherein the DC-DC converter is configured as a reconfigurable DC-DC converter arranged to convert the DC output to a higher voltage DC output or a lower voltage DC output according to a discrete selection of predefined conversion ratios.

16. The energy harvesting system according to claim 8, wherein the DC-DC converter is a flying capacitor inductorless DC-DC converter.

17. The energy harvesting system according to claim 8, wherein the DC-DC converter is arranged to provide a multiple voltage level output comprising multiple output terminals having different output voltage levels.

18. The energy harvesting system according to claim 15, wherein the control unit is arranged to operate the DC-DC converter to convert the DC output in accordance with a Maximum Power Point Tracking (MPPT), control scheme, and wherein the MPPT control scheme is based on matching a connected load with a current and voltage of the energy harvesting source.

* * * * *